United States Patent [19]

Pennell

[11] 4,081,285

[45] Mar. 28, 1978

[54] PORTLAND CEMENT MANUFACTURE

[75] Inventor: Anthony Robin Pennell, Gravesend, England

[73] Assignee: The Associated Portland Cement Manufacturers Limited, London, England

[21] Appl. No.: 758,409

[22] Filed: Jan. 11, 1977

[30] Foreign Application Priority Data

Jan. 19, 1976 United Kingdom ............... 1949/76

[51] Int. Cl.² ............................................. C04B 7/36
[52] U.S. Cl. .................................... 106/100; 106/103
[58] Field of Search ............................... 106/100, 103

[56] References Cited

U.S. PATENT DOCUMENTS 3,127,455  3/1964  Culbertson ........................ 106/100

Primary Examiner—J. Poer
Attorney, Agent, or Firm—Diller, Brown, Ramik & Wight

[57] ABSTRACT

Waste matter is incinerated in a combustion zone external to a rotary cement kiln. The resulting gaseous product is taken up in effluent gas from the cement making process in contact with calcareous material. At least some of the combustion zone bottom ash is combined in the eventual standard Portland cement by firing it in the kiln with the clinker-forming materials. The combustion zone can for instance be a fluidized bed combustor. The combustion zone can be a zone through which the clinker-forming materials pass at a temperature such that the waste matter ignites.

13 Claims, 4 Drawing Figures

PORTLAND CEMENT MANUFACTURE

The present invention relates to a method of making Portland cement, and more particularly to a method of making Portland cement of standard quality in association with the incineration of waste matter such as refuse, the products of incineration being assimilated or rendered innocuous in the cement making process.

Portland cement is manufactured by grinding and blending calcareous and argillaceous raw materials in specified proportions in wet or dry form, and subjecting the resulting mixture successively to drying if necessary, decarbonation of calcium carbonate present, and a clinkering stage in which calcium oxide reacts with silica and other metal oxides. The mixture subjected to these three stages is referred to herein as clinker-forming material. The resulting clinker is cooled, and ground to provide Portland cement.

Portland cement is manufactured to comply with established standards, for example British Standard Specification BS 12, U.S. Standard ASTM C 150-67, West German Standard DIN 1164 and French Standard NF P 15-302, (cf. "Cement Standards of the World— Portland Cement and its derivatives", Cembureau, Paris, 1968). We refer to cement complying with any such national standard as "standard Portland cement" and we include classes of Portland cement such as Ordinary Portland Cement, Rapid Hardening or High Early Strength Cement, High Strength Portland Cement, Low Heat Portland Cement, Sulphate-Resisting Portland Cement and Air-Entraining Portland Cement, it being understood that where recognised additions are made to the clinker to obtain the product, these are to be taken as having been added.

The present invention may be applied to any of the various Portland cement making processes which employ a rotary kiln. In the wet process the materials, ground if necessary, are blended and fed to the rotary kiln as a slurry in water; in the semi-wet process the slurry is converted to nodules and preheated before entering a shorter kiln; in the dry process raw materials are ground, blended and fed to the rotary kiln in the dry state, or to a shorter kiln through a preheater; in the semi-dry process the dry ground and blended materials are nodulised before being fed to a preheater and kiln.

The object of the cement making process is a product of consistent quality in excess of the minimum standards. The present invention must in the nature of the case also fulfil this object.

A wide range of raw materials can be used. Provided the correct constituents are found, and no deleterious matter is allowed to be included, the manufacture of Portland cement depends solely upon the careful and accurate choice and treatment of the constituents. It is most important that the materials be treated with a complete knowledge of the chemical and mechanical operations of combining them, as this alone can secure the regular manufacture of a reliable product.

The chemical composition of the feed must be known and controlled within very narrow limits by proportioning the raw materials, so that the resultant mixture may be relied upon to contain the exact chemical constituents necessary for the manufacture of a thoroughly strong and sound cement. If the raw materials are not mixed in this proper proportion little or nothing can be done at the later stages of burning and grinding to correct it and an inferior product will result.

The burning temperature at which, in a given time, there is substantially complete combination of the lime is influenced not only by the chemical composition of the mix but also by the mineralogical nature of the raw materials.

At some point in the process prior to clinkering the materials to be clinkered must be brought into intimate contact, thoroughly dispersed into each other, to enable the clinkering reactions to occur properly, and to that end sufficiently finely subdivided in the preliminary stages of grinding and/or slurrying. In a typically prepared feed 90 to 95 per cent will pass through a No. 170 BS sieve (4900 meshes/cm$^2$).

Fineness of the raw feed is probably the most important single factor influencing cement quality. Coarse feed leads to incomplete combination, resulting in the presence in the final clinker of undesirable compounds, including excess free lime.

The feed must not only be sufficiently fine, it must also be sufficiently homogeneous. Although elaborate measures are adopted in the slurry stages and in reclaiming dry raw mix from specially arranged stockpiles, to smooth out variations in composition, it is further necessary to correct the composition in agitated multiple blending tanks or silos subject to sophisticated continual analysis and control.

The factors discussed above, particularly composition, fineness and mineralogical nature, influence the combinability of the materials to be burned, and the combinability determines the required burning temperature. A small change in temperature may be accompanied by a large change in free lime. The distribution and state of chemical combination of e.g., the silica in the raw materials will have an effect on the combinability temperature. Time of heating is also important in effecting combination.

The position is even less straightforward when substances are present which have a mineralising effect, especially if there is a significant recirculating burden of volatile mineralisers. Mineralisers may augment the liquid phase or alter its viscosity, or they may cause the feed to enter the burning zone in an intermediate state more ready to combine. Mineralisers include a number of common substances. Having regard to the introduction of waste matter such as refuse or its combustion products into the burning zone it is to be noted that commonly encountered mineralisers include iron oxide, magnesia, sulphate ion, chlorine and fluorine.

There is an optimum burning regime in which, for a given composition, adequate combination is attained with the minimum of crystal growth. Optimum burning conditions for a particular mix are of fundamental importance in the production of high quality cement.

Optimum burning conditions are oxidising conditions. Reducing conditions can occur when the fuel/air ratio is incorrect, when the raw mix contains carbonaceous materials, or if partly burned fuel deposits on the clinker bed, and produce reactions which lead to degradation of alite to belite plus free lime, and by altering the liquid phase content, upset the required combinations in a complex train of reactions. If coal ash is being deposited heterogeneously it can form molten skins on clinker, sealing off the porosity and limiting reoxidation.

The major clinkering reactions take place through the liquid phase. The minimum temperature at which liquid forms in a raw mix, and the changes in liquid characteristics with varying temperature, are of great importance to cement quality, and vary from mix to mix.

In relation to the possible introduction of waste matter in the burning zone it is relevant to consider that when coal is burned in a rotary kiln a large proportion of the ash becomes incorporated in the clinker. The raw meal composition has to be adjusted to accommodate the ash and still produce the required constant clinker composition. The coal ash content has to be maintained within close limits, normally within plus or minus 2 or 3 per cent. It is also important to ensure the homogeneous incorporation of the ash into the charge in the kiln.

Particles of ash may fall out of the flame, onto the outside of the nodular feed material formed in the rolling action of the kiln; this results in clinker nodules with a silicate-rich skin and an over-limed core. The hard burning necessitated by such heterogeneity can cause operational problems such as shortened refractory life and high kiln shell temperatures, as well as causing a significant reduction in eventual concrete strength.

Unburnt matter may fall out of the flame onto the feedstock and there consume oxygen from the raw material oxides, producing the results of reducing conditions already referred to. Substances for combustion should possess a sufficient rapidity of ignition and combustion to burn while still suspended in the flame zone. Adjustment of the kiln feed chemistry to accommodate eventual ash absorption can have secondary effects such as an increased tendency to evolve dust, and a lowering of nodulising propensity.

Not all combustible substances will be expected to yield an ash which is combinable with cement clinker.

It is apparent from the foregoing that the chemical composition of the feed and of combustible matter must be rigorously controlled and that the thermal input and firing rate must be critically matched to the feed for good burning. The need to know precisely what goes into the kiln is reinforced by the fact that corrections to the feed take an appreciable time to affect the output at the point of control.

The quality of the product is adversely affected also by the presence of deleterious substances. Many organic substances in quite minute quantities have an adverse effect, and most inorganic oxides and salts adversely affect the quality of cement.

Processes for the manufacture of Portland cement include provisions not only for ensuring a standard product, but also for avoiding the release of noxious effluent into or unacceptable pollution of the environment.

The modern Portland cement works is capable of keeping environmental pollution within bounds, particularly in respect of dust suppression and the limitation of unwanted flue emissions, by virtue of substantial supplementary equipment such as precipitators, devoted to that end, and/or by recycling. Chimney stacks up which cement works gaseous effluent is released to the atmosphere are also normally of very considerable height, compared with typical refuse incinerators. The total output and effluent from a satisfactorily operating cement works is useful or innocuous material.

It is an advantageous feature of the process of the present invention that the abovementioned provisions for ensuring product quality and effluent control are effectively maintained in spite of the consumption, in the process, of waste matter which may contain, or may evolve on burning, noxious, pollutant or toxic substances.

The calcareous content of Portland cement has a basic character, i.e., an alkaline reaction in water, which it imparts to the clinker-forming materials and which is maintained in the solids throughout the cement-making process and persists in the Portland cement product, by virtue of the requisite proportions of raw materials used. Consequently the initial feed of calcareous material such as chalk or limestone, the product of blending it with argillaceous material, whether wet or dry, i.e., the clinker-forming materials before, during or after decarbonation, the clinker itself before, during or after grinding, and dust arising from any of these within the plant, are all basic material in the Portland cement making process.

The invention is applicable with particular advantage to waste matter in the form of refuse, i.e., normally municipally collected refuse. Refuse comprises material collected predominantly if not completely in a solid condition, and includes garbage (which is food waste, animal and vegetable waste from handling, storage, sale, preparation, cooking and serving of foods) and rubbish (a general term for solid waste excluding garbage and ashes, taken from residences, commercial establishments and institutions). Refuse usually contains ash, glass, metals, paper, plastics, vegetable and animal waste.

Refuse has hitherto been disposed of mainly by tipping or dumping, with or without prior mechanical treatment; by incineration in specially designed plant; or by composting. Each method incurs a major disadvantage, due to the need for suitable land space or for costly equipment and its operation, or to the presence of intractable substances. The common occurrence of plastics materials in refuse can give rise to noxious or chemically active, particularly acidic, effluent gases when subjected to incineration.

A method of disposing of or utilising refuse is desirable in which use is made of any residual values therein, with maximum economy and negligible or no attendant pollution. In this respect the recovery of the heat energy value of the refuse offers the possibility of maximum economy. It is an object of the invention to provide a process in which test energy and other values of waste material are recovered directly in existing plant and assimilated beneficially with the production of substantially no added effluent from the plant.

In our United Kingdom patent specification No. 1,405,294 we have described a method of burning Portland cement raw materials under appropriate conditions to form Portland cement clinker in a rotary kiln wherein the raw materials are fed into one end of the kiln and fuel for firing the kiln is blown into the burning zone with sufficient combustion air at the opposite end of the kiln, and wherein disintegrated or pulverised municipal refuse is also injected into the combustion zone at the end of the kiln where the fuel is blown in. Combustion of the refuse occurs in the fuel combustion zone and the resulting ash is added to the clinker being formed in the kiln while gaseous products of refuse combustion are entrained in the gase passing through the kiln, and thereby scrubbed by the hot basic calcareous material present before passing through the normal cement works gas-glow path to atmosphere.

The method disclosed in U.K. patent specification No. 1,405,294 was based on the following discoveries which in the light of the foregoing discussion regarding cement quality control, were surprising.

a. Municipal refuse, received as such or shredded, can in fact be reduced to a pulverised or disintegrated form in which it can be conveyed and injected in controlled quantity into a rotary kiln, in the manner of pulverised coal.

b. Municipal refuse ash can surprisingly be combined into Portland cement clinker if the refuse itself is introduced directly into the rotary kiln combustion zone.

c. Because the refuse ash can be combined in the clinker and is not a mere diluent, its presence can in principle be allowed for.

d. The raw feed to the kiln can be adjusted in actual practice to accommodate the eventual refuse ash, without sacrificing standard cement quality.

e. When making the adjustments referred to in (d) it is unexpectedly also possible to cope with variations attributable to the refuse.

f. The refuse can be burned without generating a nuisance if it is introduced directly into the combustion zone, while making Portland cement. The effect on dust raising is negligible and there is no significant increase in the content of harmful materials in the dust. Trace elements are not a health hazard even at a high level of replacement of fuel by refuse; the amounts are neither significant nor dangerous. In the kiln back end exhaust there is no HCN, and no harmful concentration of HCl, $CL_2$ or $SO_2$. Corrosion in effluent ducts is not accelerated. The elimination of the HCl encountered in burning refuse in conventional incinerators is an important advance provided by the invention.

g. The energy content of the refuse is usefully applied, regardless of the quantity of refuse involved, because it is not burned alone but with other fuel.

h. The controllability of the cement making process can accordingly be exploited to entirely dispose of refuse and still obtain Portland cement of high (not merely standard) quality, while also achieving substantial fuel economy.

From the refuse disposal viewpoint, burning refuse at the temperatures involved in the rotary kiln combustion zone, i.e., typical cement manufacturing temperatures of about 1350° C and a flame temperature of about 1800° C, has the advantages over normal municipal incinerators of providing (1) a temperature at which there is virtually complete destruction of the refuse material, leaving no unwanted residue to be transported away, (2) adequate scrubbing of the gases released from the refuse, by the basic cement-making materials present, thus reducing corrosion problems and acidic gas emissions to the atmosphere and (3) elimination of the possibility of emitting offensive odours from the stack.

The present invention is based on the further discovery that in spite of the inherently variable and somewhat unpredictable nature of waste matter the foregoing advantages as well as further advantages are obtainable, while still producing standard Portland cement and incinerating refuse or other waste matter, but performing the incineration in a zone external to the rotary kiln.

Considerations taken into account in this connection include the better and more efficient use of any heat value in the waste matter, the possibility of increased refuse disposal capacity for a given plant, and a wider range of acceptable waste matter, as well as increased operational flexibility.

According to the present invention we provide a process of making Portland cement employing at least one rotary kiln supplied with calcareous and argillaceous materials at one end and fired with fuel supplied at the other end with initially combustion-supporting gas which passes through the kiln; in which process waste matter other than a fuel is incinerated in a zone external to the rotary kiln to yield a gaseous incombustible product and a bottom ash product; said gaseous product from said zone is incorporated in effluent gas from the process while in contact with calcareous material employed in the process; at least a proportion of said ash product is added to said calcareous and argillaceous materials and chemically combined therewith in the firing of said materials by means of said fuel to form Portland cement clinker in the rotary kiln; and the resultant clinker is subsequently ground to standard Portland cement.

Refuse and similar material may in some embodiments of the invention be used without prior preparation, subject to a practical limitation on the size, particularly the length, of pieces required to pass through feeding equipment which may be involved, such as rotary valves. In other cases it may be advantageous to facilitate the introduction of the material by subjecting it to drying or to one or more preparatory stages of disintegration, for instance in a so-called pulveriser known for such purposes. Other preparatory treatment may if desired or required include segregation of specific classes of substance, for example by rotary screening or by magnetic or ballistic separation. Alternatively materials which will undergo passage through the process according to the invention and remain separable from the product, may be removed subsequent to the process; such a procedure can offer the advantage that the separable material will have been refined by firing.

Other waste matter can be disposed of by adoption in the method of the invention, including solvents and toxic industrial or other wastes, waste oils, and so forth, on its own if it produces a bottom ash on combustion in the incinerating zone, or together with ash-producing waste. In general an incineration temperature of at least 750° C will be reached to produce the ash for combining in the clinker. The material supplied for the incineration may include a proportion of substances which are not entirely, or not at all, transformed into ash and gaseous products, provided that these substances, such as metals or glass, are separable from the clinker product or are combined in the clinker without detriment to the standard Portland cement produced. Liquid wastes present or formed will generally be flash vaporised in the process.

Waste matter which may be disposed of by means of the present invention may be quite generally of industrial, institutional or domestic origin, whether public or private, and include by way of example widely varied waste materials of the following natures:

Abattoir waste; offal;
Acid-contaminated oil;
Ammonia derivatives;
Bank notes for destruction;
Bark from paper manufacture;
Blood plasma;
Brewery mash and hops waste;
Cable insulation and cable impregnating waste;
Carbon black and other pigments;
Carbon from purifying towers;
Carpet fibres;

Car upholstery;
Clothing; cotton wool;
Coal tips;
Cocoa bean husks;
Coconut shells and husks;
Coffee bean waste;
Colliery and Ore tailings;
Conveyor belting;
Cooking oil waste;
Creosote;
Cyanides;
Detergents; dry cleaners and cleaning fluids;
Dyestuffs;
Excavation from waste tips;
Factory farming wastes; hen battery litter;
Fibreglass;
Filter elements, filter paper or fabrics and filter aids, contaminated;
Fish wastes;
Frozen-food processing vegetable waste; pea vines;
Foil from cigarette packaging;
Fullers earth;
Furniture factory waste;
Garbage;
Glues;
Grass cuttings;
Hairdressing waste;
Hospital theatre and surgery wastes;
Juice extraction mush;
Leather offcuts;
Millers' chaff;
Minestone;
Motor oil and other functional fluid wastes;
Municipal refuse;
Newsprint waste;
Paint sludge;
Paper mill pulp;
Peanut husks;
Pesticides and Herbicides;
Pharmaceutical wastes including off-specification drugs, vaccines, petroleum jelly cultures;
Printing ink machine clean-down waste;
Plastics demoulding waste;
Refinery waste; waxes;
Rejected food cans;
Rice husks;
Rubber tyres;
Rubbish;
Sawmill waste;
Seaweed;
Seed oil extraction waste;
Sewage, sludge;
Ship's bilge residues;
Silicon carbide;
Soap manufacture wastes;
Solvents;
Soya bean waste;
Straw;
Sugar beet;
Tea waste;
Test Laboratories waste;
Timber from building sites;
Trash;
Vacuum filter precoat;
Vegetable parchment, contaminated with sulphuric acid;
Waste catalysts;
Waste from town gas manufacture;
Wine-making residues;
Wood shavings; wood mill waste.

The gaseous combustion product of the incinerating zone is effectively scrubbed by contact with the basic material and eventually exhausted from the plant subject to the same precautions as are applied to the normal gaseous effluent of the cement making process.

In order to satisfy the requirement that the gaseous product from the incineration zone shall be incorporated in effluent gas from the cement making process it is sufficient, in view of the basic nature of the calcareous material already referred to, to entrain the gaseous product in the effluent gas at any point prior to the stage at which the effluent gas is cleaned for discharge, for instance at a point before the electrostatic precipitators, such as in the initial grinding mill, the circulating air from which is discharged through the precipitators. However, in the preferred embodiments of the invention and particularly in cases where the gaseous product of incineration has useful heat value derived from the waste matter, the effluent gas in question is the gas which passes through the kiln. Thus the gaseous product can be entrained in the effluent gas by introducing it at one of a variety of points in the cement plant gas path, e.g., into the firing end of the rotary kiln, into the gas exhaust outlet of the kiln, into a preheating stage for preparing the feed to the kiln or into the conduit connecting that stage to the kiln, or into the gas exhaust line leading to the precipitators.

According to a first preferred form of the invention the incineration zone for the waste matter is a zone through which said calcareous and argillaceous materials pass at a temperature such that the waste matter ignites therein. The zone may thus be a portion of a travelling grate preheater for said calcareous and argillaceous materials or may be within a gas suspension preheater or precalciner for said calcareous and argillaceous materials, or the zone may be within aa duct directly connected to said one end of the rotary kiln such as a feed chute through which preheated materials descend into the back end of the kiln, which may also constitute the riser for kiln gas effluent.

In embodiments of this form of the invention, incineration of the refuse is brought about within an operational zone inherent in the cement making process where the resulting heat can be usefully absorbed, the resulting ash being directly and immediately added to an incorporated in the clinker-forming material for subsequent combination therewith by firing, while the gaseous combustion product joins the prevailing current of gas in the zone in its path in contact with suspended or supported basic, i.e., clinker-forming material.

According to a second preferred form of the invention the incineration zone is external to the path of the calcareous and argillaceous materials through the process and the gaseous product is employed most preferably to impart heat to said materials prior to their entry into the rotary kiln. In this embodiment an auxiliary furnace is used to burn the waste matter, and the resulting gaseous product and bottom ash may be introduced together or separately into the same or different parts of the cement plant to suit particular circumstances or advantages. Locations for entrainment of the gaseous product are referred to above; there may be fly ash entrained in this gaseous product which can be at least partly taken up in the cement system, for instance in dust recycled from the precipitators to be insufflated into the front end of the kiln. Some or all of the bottom ash is conducted to at least one of a number of possible points of entry for addition to the clinker-forming material, preferably prior to entry thereof into the rotary kiln, such as the initial grinding mill, the preparation stage including blending for the cement raw materials as dry meal or slurry, a preheating or precalcining stage such as a slurry spray dried, a gas suspension preheater or a travelling grate preheater, or the feed solids entry chute of the rotary kiln. Ash may alternatively be introduced into the firing end of the rotary kiln.

Various embodiments are discussed more fully below, firstly with reference to the first mentioned preferred form of the invention.

Refuse may be introduced into a travelling grate precalciner such as a "Lepol", in which clinker-forming materials fed in continuously are heat-treated before being allowed to fall into a rotary kiln. Such a travelling grate typically comprises two compartments in sequence for respectively drying and partly calcining clinker-forming material as it is carried as a bed of nodules through the compartments on the moving grate, heat normally being supplied to the bed by drawing downwardly through the bed in each compartment in turn, a current of the hot gas issuing from the back end of the associated rotary kiln, by means of induced draught fans. Waste such as refuse may be dropped into the second or precalciner compartment e.g., through a double flap valve, from where the prevailing suction will draw it onto the bed, optionally with fuel material such as peat or oil or with hot gas from an auxiliary supply. The combustible matter is preferably directed towards that part of the bed which has most recently entered the compartment, and burns to an ash, which is added intimately to the clinker-forming material for subsequent combination in the kiln; and to a gaseous combustion product which is drawn through the hot material containing the basic calcareous constituent on the travelling grate together with the normal gas flow on its way to dust extraction plant such as precipitators.

Waste such as refuse may be similarly introduced into and burned within a gas-suspension preheater stage which may also be associated with a furnace for supplying heat to the preheater, in which clinker-forming materials are pretreated for instance in a sequence of cyclones before entering the rotary kiln. The ash from the refuse may be allowed to fall from the preheater, added to and entrained in the clinker-forming material, down the usual chute into the kiln, while the gaseous combustion product from the refuse joins the upgoing suspension gas as it passes through the cyclones in counterflow to the cement materials containing the basis calcareous constituent, on the way to dust extraction plant.

Waste such as refuse may be introduced by means of a valve or with the aid of a conveyor leading into the conduit through which the clinker-forming materials descend to enter the rotary kiln, where the waste will be incinerated, the resulting gaseous product as in other embodiments being taken up in the normal gas stream from the kiln and serving to enhance its heating value in any preheating stage attached to the conduit, while the ash descends into the kiln for combination in the clinker product.

In embodiments of the second abovementioned preferred form of the invention preferably a fluidised bed combustor is employed in which the waste material is burned. A particularly suitable fluidised bed combustor, which can accept the most widely varied materials in respect of size as well as type, has a downward sloping floor and provision for setting up by control of the air supply underneath the bed, a recirculatory flow of partly combusted material in an upward loopwise manner while ash is withdrawn from the lowermost part at an appropriate rate in relation to the feed and combustion rates. Fluidised bed combustors of this type are described for instance in United Kingdom patent specifications Nos. 1,299,125 and 1,448,196. Other fluidised bed combustors particularly intended for burning refuse are described for instance in United Kingdom patent specifications Nos. 1,212,887, 1,268,924 and 1,370,096.

The use of the fluidised bed enables the method of the invention to be performed in a versatile manner, with respect to acceptable combustible matter and with respect to location of entry of the combustion products into the cement process.

Advantageous examples of connections between the fluidised bed combustor and the cement-making process are the following, given by way of illustration and capable of further variations:

1. Ash to any point between initial grinding and rotary kiln; Hot gas to junction between kiln and cooler.
2. Ash to suspension preheater; Hot gas to suspension preheater.
3. Ash to travelling grate preheater; Hot gas to travelling grate preheater.
4. Ash to kiln; Hot gas to cement slurry spray drier (from which the dried product passes to the kiln).
5. Ash to initial mill; Hot gas to initial mill.

In certain embodiments the heat available from the fluidised bed combustor may exceed that which is useful in the stage of the cement-making process to which it is supplied, notably in the case of the spray drier. In such cases it is advantageous to extract heat, e.g., in the form of steam, by means of a heat exchanger in the path of the hot gaseous combustion product, inside or outside the combustion chamber, or by means of heat exchange tubes passing through the hot fluidised bed. On the other hand if the gas is of special interest as a supply of heat, the temperature of combustion may be raised.

The method of the invention is applicable to any process for making Portland cement. Adjustments are made as necessary to the normal fuel supply to the process to take account of the calorific contribution of the combustible matter, and adjustments are made to the clinker-forming material feed to take into account the clinker-forming contribution of the ash. These adjustments are, of course, related to the proportion of combustible matter incinerated with reference to the fuel supply to the cement-making process.

The proportion of combustible matter which can be assimilated by the method of the invention may be limited by the extent to which traces of any toxic materials such as lead or zinc in the effluent may have to be taken in account, or by the influence of the ash on the standard product composition. The weight of combustible matter incinerated expressed in terms of the weight of clinker produced, can amount to as much as 60 per cent or even more; however, even a few per cent in a commercial cement-making process represents a considerable quantity of combustible matter, and in relation to municipal refuse, for instance, it enables the assimilation of the refuse of a substantial city to be contemplated in one cement works.

The invention will now be further described by way of illustration with reference to the accompanying drawings, in which.

Figure 3:
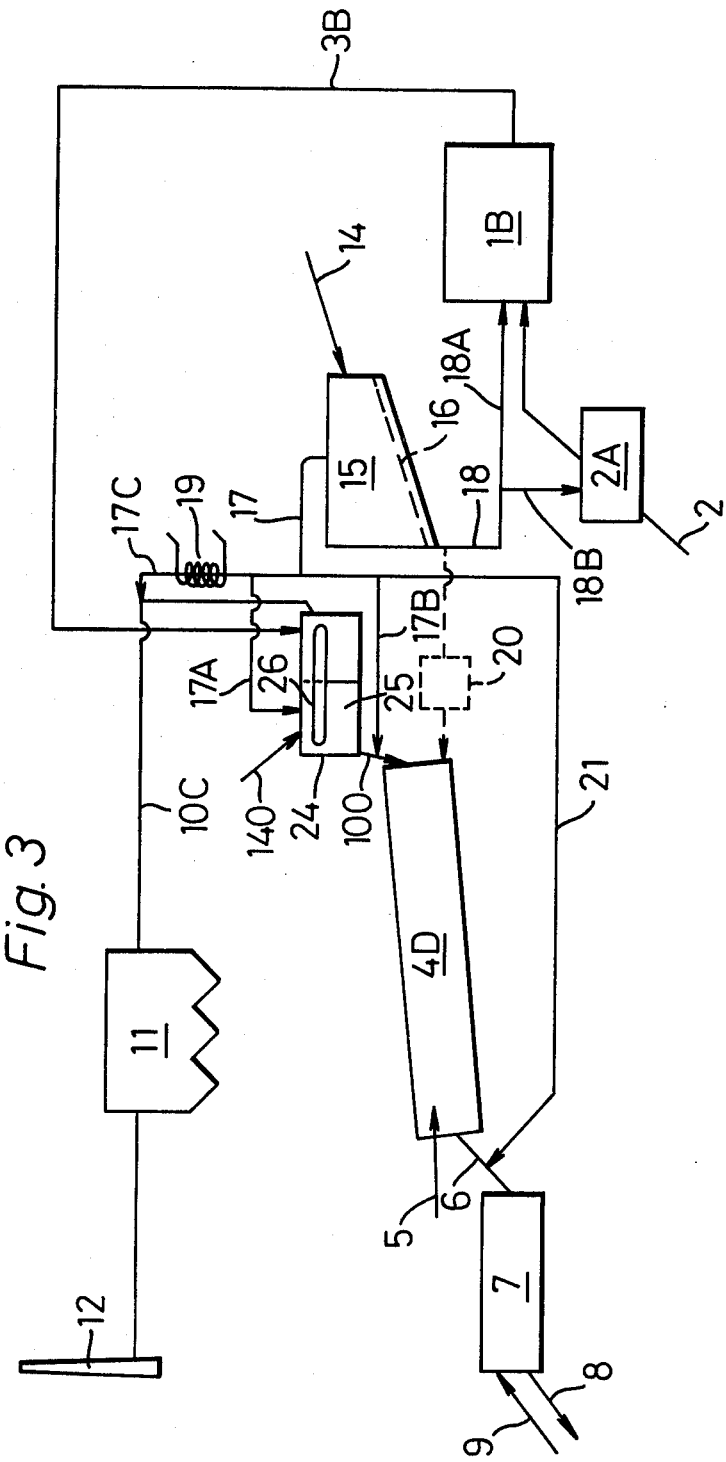
Figure 4:
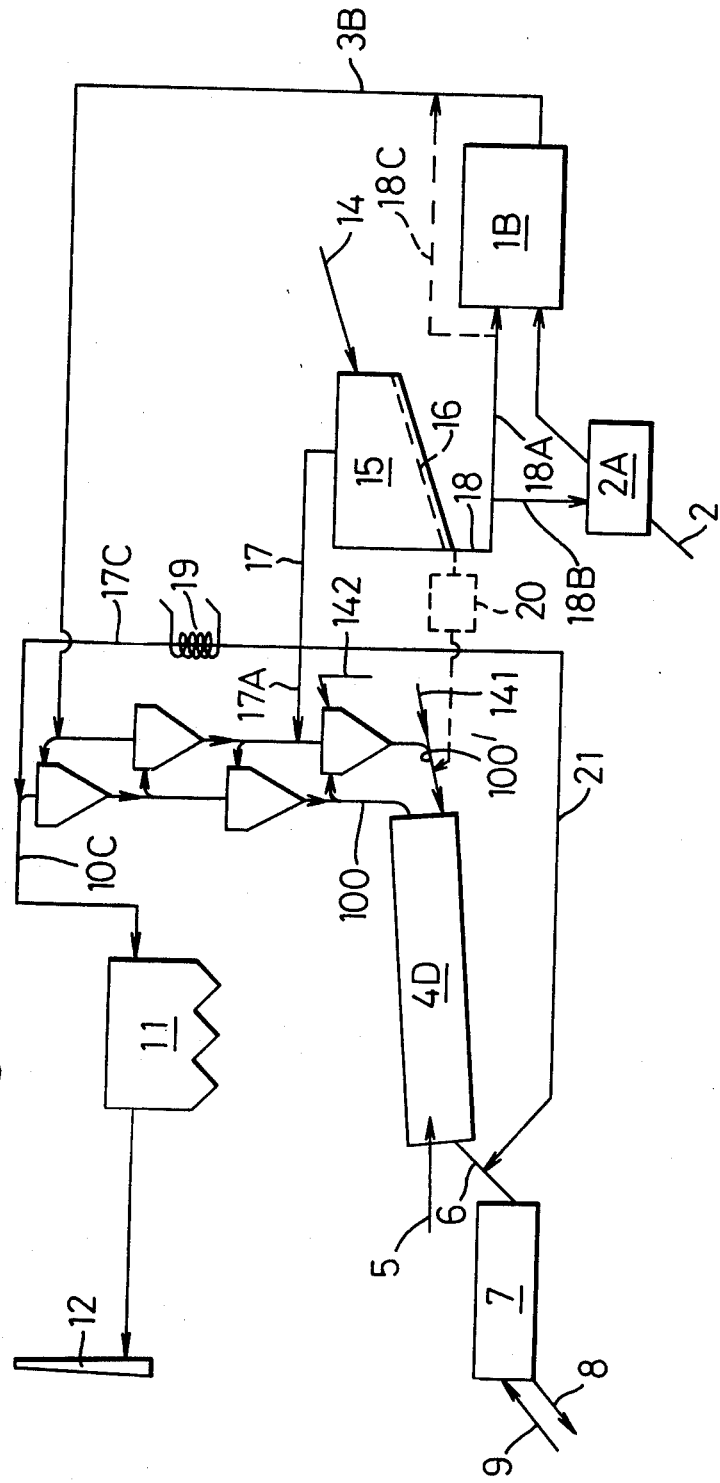

FIG. 3 is a flow diagram for a dry or semi-dry process cement making plant employing a travelling grate preheater, and either using a fluidised bed combustor for waste matter according to the second preferred form of the invention or using the downstream compartment of the travelling grate as a waste matter incinerating zone according to the first preferred form of the invention; and FIG. 4 is a flow diagram for a dry process cement making plant employing a gas suspension preheater, and either using a fluidised bed combustor for waste matter according to the second preferred form of the invention or using the connecting duct between the preheater and the rotary kiln, or a zone in the preheater, as a waste mater incinerating zone according to the first preferred form of the invention.

In the Figures only those essential parts of the plant particularly relevant to the invention are shown; the usual ancillary apparatus will be understood to be present in the cement-making plant. Features having analogous functions are indicated by similar or related reference numerals.

Figure 1:
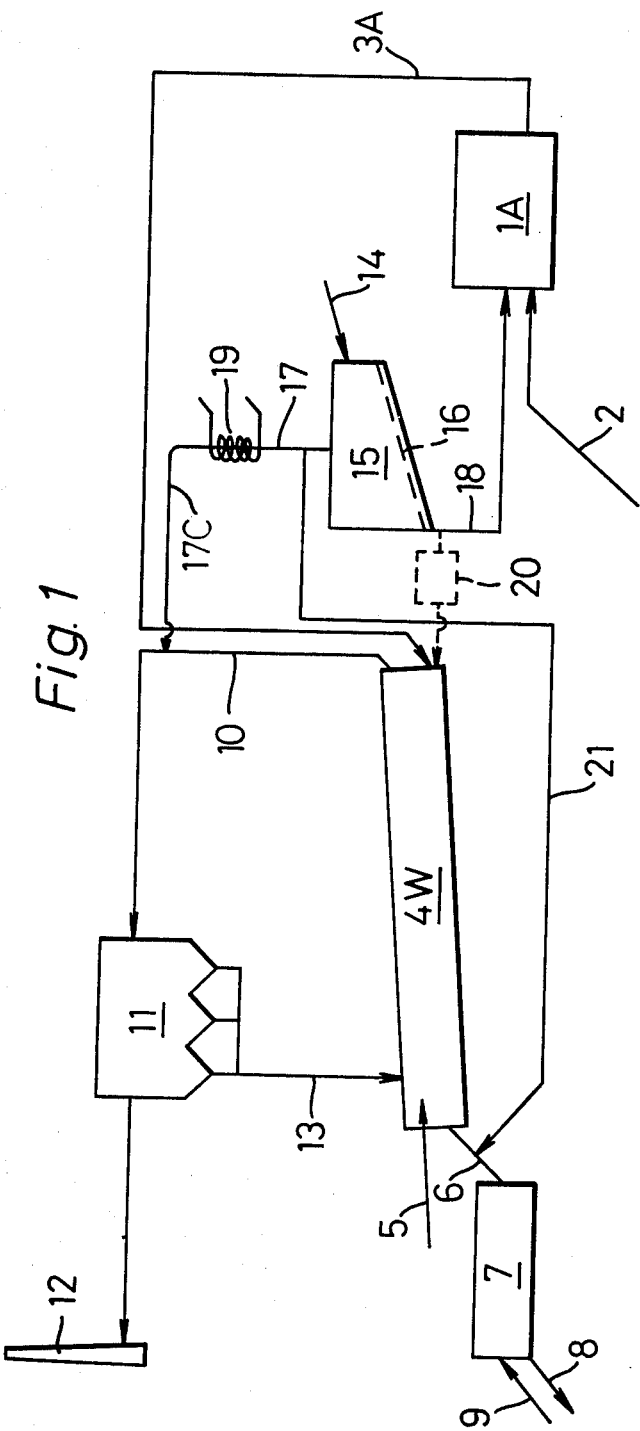
FIG. 1 is a flow diagram for a wet process cement making plant employing a fluidised bed combustor for waste matter according to the second preferred form of the invention.

Referring to FIG. 1, there is shown a slurry preparation stage 1A, typically comprising washmills for chalk and for clay, screens, and blending and finished slurry storage tanks. This stage is supplied with water and the chalk and clay raw materials 2, and the prepared slurry is conveyed by pipeline 3A to be fed into the back end of the rotary kiln 4W. In the kiln 4W the slurry is dried, decarbonated and converted to Portland cement clinker by the heat developed in burning fuel blown in at the front end 5 of the kiln 4W. The hot clinker discharges from the kiln 4W through a hood at 6 to pass through cooler 7 for discharge at 8 to a final grinding stage, not shown.

Air supplied at 9 to the cooler 7 becomes heated in cooling the clinker and provides preheated secondary air for the fuel injected into the kiln 4W where it supports the combustion of the fuel. The gaseous effluent from the kiln 4W is taken through duct 10 to be dedusted in electrostatic precipitators 11 and released to the atmosphere up stack 12. Dust collected in the precipitators may be returned to the kiln 4W via line 13 to the front end of the kiln or via scoops (not shown) to a point further up the kiln.

Waste matter 14 is fed to the shallow end of a fluidised bed combustor 15. The combustor 15 is constructed with a sloping bed support 16 provided with apertures which are arranged to be selectively supplied from beneath with fluidising air from a supply not shown at differential rates, the plenum chamber under the support 16 being compartmented for this purpose, and the result being a circulatory movement of the materials of the bed about a substantially horizontal axis. The waste matter is incinerated in combustor 15 in a manner known as such to form a gaeous combustion product which issues by duct 17 and a bottom ash which passes into a conveyor 18 to be taken to the slurry preparation stage 1A for incorporation with the cement raw materials, for example before the blending tanks.

In one form of the embodiment illustrated in FIG. 1 the gaseous product issuing by duct 17 passes through a heat exchanger 19 which permits surplus heat energy to be tapped off to ancillary uses, and is fed via duct 17C into duct 10 where it joins the calcareous dust-bearing effluent from the kiln 4W to be dedusted and released to the atmosphere as already described. In an alternative form of this embodiment the hot gaseous product from combustor 15 goes via a conduit 21 to join air entering the kiln at 6, if the hot gaseous product is at a temperature sufficiently high for it to be useful in that direction.

Ash may alternatively be taken from line 18, and if necessary milled in a mill 20, before being fed directly to the back end of kiln 4W with the slurry supplied in pipe 3A.

Heat exchanger 19 in effect represents provision for heat exchange in the fluidised combustor system generally and may be supplemented, or substituted by heat exchange means (not shown), in the hot gas stream within the combustor 15, or within the bed which burns on the support 16. Water supplied for heat exchange, in exchanger 19 or in other heat exchange means associated with combustor 15, may also contain heat derived from elsewhere in the cement-making system.

In those embodiments of the invention where the waste matter is incinerated within a zone through which the calcareous and argillaceous materials pass, the resulting bottom ash will in general be all added to the calcareous and argillaceous materials in the course of their passage through the plant. In the cases where the waste matter incineration zone is external to the path of the calereous and argillaceous materials through the process, however, not all the bottom ash necessarily passes automatically into the cement-making process although in general it will all be eventually consumed in the process in order to secure the maximum waste disposal advantage. The invention permits a degree of flexibility in this respect and when the waste matter is such that the main interest lies in disposing of the gaseous incineration product and/or recovering heat value from the waste matter, and the ash can find alternative uses, then the ash added to the calcareous and argillaceous materials may be only a proportion of the bottom ash produced in the incineration zone, depending on the economic considerations. In such cases at least 20 per cent, preferably at least 50 per cent and most preferably at least 90 per cent, by weight of the bottom ash is eventually fed, by line 18 or otherwise, to the cement-making part of the system.

In all cases the raw material feed to the cement-making process is composed so as to take into account any contribution of ash to the eventual clinker composition.

Figure 2:
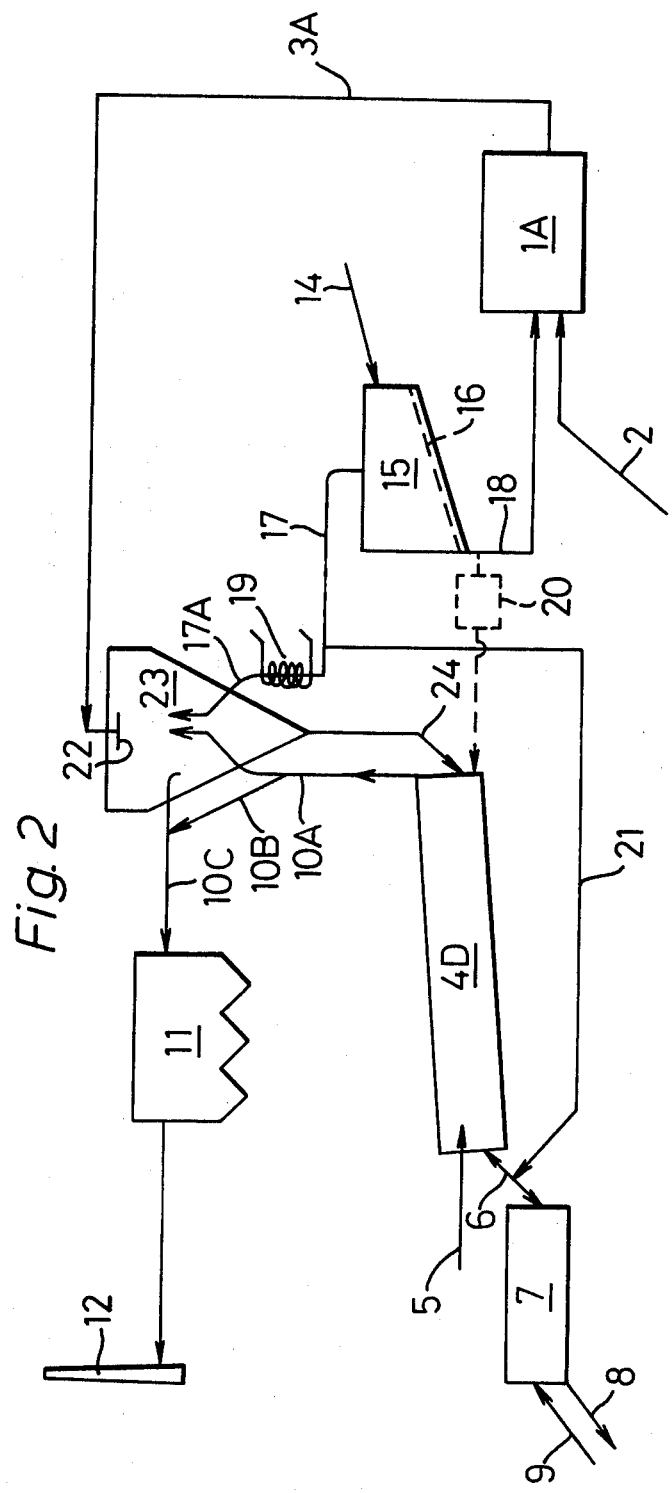
FIG. 2 is a flow diagram for a semi-wet process cement making plant employing a spray-drier for kiln feed preparation, and a fluidised bed combustor for waste matter according to the second preferred form of the invention.

In FIG. 2 there are shown a slurry preparation stage 1A fed by raw materials 2 and water, a slurry pipeline 3A, fuel supply 5, hood 6, cooler 7, clinker discharge 8, air intake 9, precipitators 11, stack 12, waste matter supply 14, fluidised combustor 15 containing bed support 16, gaseous product conduit 17 and ash conveyor 18, heat exchanger 19, mill 20 and alternative gaseous product conduit 21, all similar to and serving essentially the same functions, as the like numbered parts shown in FIG. 1.

Of the slurry prepared in stage 1A at least a proportion is spray dried and any remainder is then mixed with the spray-dried product; by suitably proportioning the amount of spray-dried material in the resulting mixture, a feed of raw material of suitable moisture content is obtained for supplying to the rotary kiln.

Accordingly at least some of the slurry prepared in stage 1A is fed by pipeline 3A to the atomising wheel 22 of a spray drier 23 where it is spray-dried in a hot atmosphere provided as described below. The spray-dried solid product passes down line 24 and is mixed, by means not shown, with any further wet slurry supplied directly from the preparation stage 1A or the pipeline 3A. The raw material feed thus prepared passes into the kiln 4D.

Kiln 4D is fundamentally similar to kiln 4W of FIG. 1 but operates as a dry process kiln and is somewhat shorter for the same throughput.

Provision is made for the hot gaseous effluent which passes up riser 10A from kiln 4D to enter the spray drier chamber 23 or to be by-passed along a duct 10B to the duct 10C which conveys exhaust gas from the spray drier 23 to the precipitator 11. Provision is also made by means of line 17A for the hot gasous product from combustor 15 to enter the spray drier chamber 23. The hot atmosphere in the spray drier is thus provided by the gaseous incineration product with an optional amount of kiln gas effluent and the resulting moist gas from the spray drier is exhausted through line 10C.

If a relatively low proportion of the kiln solids feed is spray-dried and the kiln effluent gas therefore has a correspondingly relatively high moisture content, it may be preferable to pass all the kiln effluent gas directly by by-pass duct 10B to the exhaust line 10C. On the other hand if the extent of the drying of the feed external to the kiln is increased, i.e., the proportion of spray-dried feed is increased, the resulting hotter and drier gas leaving the kiln by raiser 3A may be usefully applied in the spray-drier. Economic considerations tend to limit the volumetric gas capacity of the spray drier, and the efficiency of mass transfer obtainable in the spray drier can lead to conditions in exhaust line 10C which approach saturation too closely; hot kiln effluent gas supplied through by-pass 10B can be used to raise the dew point of the gas in exhaust line 10C before it reaches the precipitators.

In FIG. 3 there are shown a kiln 4D as in FIG. 2, and a fuel supply 5, hook 6, cooler 7, clinker discharge 8, air intake 9, precipitators 11, stack 12, waste matter supply 14, fluidised bed combustor 15 containing bed support 16, gaseous product conduit 17, ash conveyor 18, heat exchanger 19, optional mill 20 and alternative gaseous product conduit 21, all similar to and serving essentially the same functions, as the like numbered parts shown in FIG. 1.

In a raw meal preparation stage 1B for instance comprising blending silos and raw meal storage silos, limestone and shale 2 mixed and supplied through an initial grinding mill 2A are prepared and stored and then conveyed by elevator 3B to granulators (not shown) which feed a travelling grate preheater 24 of the downdraught "Lepol" type, which in turn feeds kiln 4D with preheated and partly calcined nodules of clinker-forming materials, by way of duct 100. Hot gas from the kiln passes up duct 100 to serve as heating medium in grate 24 before being exhausted by duct 10C to the precipitators.

The gaseous incineration product in line 17 is passed by line 17A through the roof of the calcining part 25 of grate 24, or by line 17B into riser duct 100, in order to augment the heat in grate 24; or by line 21 to the front end of the kiln; or by line 17C through heat exchanger 19 to the precipitators 11.

The ash from the fluidised bed is conveyed either by line 18A to the blending stage or by line 18B to the initial mill, for incorporation into the feed prepared for the cement-making process, with or without milling. The gaseous product in line 17 can also be supplied, by means (not shown) associated with line 18B, to the raw mill 2A.

Waste matter 140 can be introduced, as an alternative to using the fluidised bed, through the grate roof and into the calciner part 25 above the bed of gate 24, by a suitable valve or by injection in air, and burns on the moving bed 26, whereby the resulting ash is incorporated in the feed to the kiln and the gaseous incineration product joins the effluent gas flow leaving by duct 10C.

In FIG. 4 there are shown a raw meal preparation stage 1B, raw material supply 2, mill 2A, conveyor 3B, kiln 4D, fuel supply 5, hook 6, cooler 7, clinker discharge 8, air intake 9, effluent gas exhaust 10C, precipitators 11, stack 12, waste matter supply 14, fluidised bed combustor 15 containing bed support 16, gaseous product conduits 17 and 17C, ash conveyors 18, 18A and 18B, heat exchanger 19 and mill 20, alternative gaseous product conduit 21, all similar to and serving essentially the same functions as the like numbered parts shown in FIGS. 1 and 3.

The elevator 3B supplies the prepared raw meal to a gas suspension preheater 27 from which the preheated particulate meal is supplied through chute 100' to kiln 4D. Hot gas for suspension and heating in the preheater is obtained from the kiln through riser 100 and eventually exhausted through duct 10C. Gaseous incineration product is introduced by conduit 17A into the gas stream of the preheater and the bottom ash may likewise be introduced into the solids prepared for treatment in the preheater. Ash may be added directly by line 18C to the preheater solids feed.

Waste matter 141 or 142 can be introduced as alternatives to using the fluidised bed, into the chute 100' or a section of the preheater, respectively, wherein it burns, the resulting ash being incorporated in the feed to the kiln and the gaseous incineration product joining the gas flow which passes through the preheater.

The following Examples further illustrate the invention.

For the purposes of illustrative calculation we assume that the waste matter is refused having (i) a net calorific value of 5000 kcal/kg on a dry ash-free basis (ii) a moisture content as fed to a combustor, of 24 per cent by weight and (III) an ash content of 29 per cent by weight.

The following heat balance is based on a refuse which contains 1 kg of fuel having a heating value of 5000 kcal, (i.e. 1.85 kg of refuse as fed).

For a fluidised bed combustor operating at a bed temperature of 900° C the following heat balance results when stoichiometric combustion conditions are established. It is assumed that heat exchange steam tubes are provided in the bed.

|  | Input kcal | Output kcal |
|---|---|---|
| Refuse combustion | 5000 | |
| Combustion products (8.250kg) | | 1930 |
| Ash (0.408 kg) | | 77 |
| Water evaporation (0.445 kg) | | 400 |
| Heat removed as steam by tubes in the bed | | 2592 |
| | | 5000 |

Assuming the gaseous combustion products are taken through a heat exchanger where the gases are cooled to 200° C, for example, producing more steam, then we have:

| Combustion products | 1500 net | |
|---|---|---|
| Losses | | 225 |
| Steam raised | | 1275 |
| | | 1500 |

The efficiency of heat recovery can be estimated as follows:

| | | kcal |
|---|---|---|
| Heat output as steam (= 2592 × 0.85) | (i) from tubes | 2203 |
| | (ii) from exchanger | 1275 |
| | | 3478 |

Heat input = 5000 kcal
Therefore efficiency = 3478/5000 or 70 per cent.

This efficiency of 70 Per cent may be compared with that obtainable in the method described in U.K. patent specification No. 1,405,294; as used in that method 4.5 tonnes of refuse have the heating value of 1 tonne of standard coal (7000 kcal/kg gross) whereas in the method of the present invention 2.6 tonnes of refuse produce the same heating effect. The former method represents an efficiency of 58 per cent.

EXAMPLE 1

Referring to FIG. 1 of the accompanying drawings, if the ash from combustor 15 represents 50 per cent by weight of the argillaceous input to the cement-making process, then for 40 tonnes per hour clinker manufacture, which requires 66 tonnes per hour of raw material of which 13.2 tonnes per hour is argillaceous component, the ash absorbed in the clinker will be 6.6 tonnes per hour, supplied from the combustion of 6.6 × 1.85/0.408 = 30 tonnes per hour of refuse.

Hence:

| | Input × 1000 kcal/h | Output × 1000 kcal/h |
|---|---|---|
| (i) for the Combustor | | |
| Refuse combustion heat input | 80750 | |
| Combustion products (133.2 tph) | | 31170 |
| Ash (6.6 tph) | | 1244 |
| Water evaporation (7.2 tph) | | 6460 |
| Heat available for steam raising in the bed | | 41876 |
| (ii) Heat exchanger (19) gases cooled to 200° C | | |
| Combustion products heat input | 24225 | |

-continued

| | Input × 1000 kcal/h | Output × 1000 kcal/h |
|---|---|---|
| Losses | | 3634 |
| Steam raised | | 20591 |
| | | 24225 |

Total heat recovery potential as steam
= 20,591,000 + (41,876,000 × 0.85) kcal/h
= 56,186,000 kcal/h The process consumes 30 tonnes per hour of refuse which is 75 per cent by weight based on the clinker, with a thermal benefit of about 56.2 × 10⁶ kcal/h as steam.

EXAMPLE 2

This Example refers to FIG. 2 of the accompanying drawings and the use of the gaseous combustion products from combustor 15 in the drying of slurry.

Taking the same quantity of refuse, 30 tonnes per hour, as for Example 1, we have 133.2 tonnes per hour of combustion product gas at 900° C.

Steam from combustor = 41,877,000 kcal/h
Exhaust temperature = 180° C
for slurry at 40 per cent moisture content:
Heat required per kg water evaporated = 708 kcal
Solids heated to 180° C = 65 kcal
                        773 kcal
                        per kg water
                        evaporated.

Combustion products cool to 180° C, releasing:
133.2 × 1000 × 0.26 × 720 = 24,935,040 kcal/h
which will dry off 32.357 kg/h of water from kiln feed slurry, thus providing 48386 kg/h of dry solids, i.e., 29.3 tonnes per hour clinker equivalent.

Heat balance for system : (basis 1 hour)

| | Input × 1000 kcal | Output × 1000 kcal |
|---|---|---|
| 30 tph refuse | 80750 | |
| Steam | | 41876 |
| Drying of slurry | | 24935 |
| Exhaust | | 13939 |
| | | 80750 |

The effect on the operation of the rotary kiln is that less fossil fuel is required. Because the moisture content of the kiln feed has been reduced to an effective level of 15 per cent for a 40 tonnes per hour clinker production level, the back end temperature of the kiln will rise. All or part of the hot gas effluent from the kiln can also be directed to the spray drier with additional potential slurry drying benefit or be used (via by-pass 10B) for maintaining the dew point at the desired level for the precipitators, depending on the proportion of heat taken from the refuse as steam or as slurry drying medium.

EXAMPLE 3

This Example refers to FIG. 3 of the accompanying drawings.

If 20 tonnes per hour of refuse are being burned in combustior 15 in conjunction with the production of 40 tonnes per hour of clinker using a Lepol grate as the travelling grate 24, the het benefit to the process (following calculations as in Examples 1 and 2) is 17,316,000 kcal/h since the system exhaust temperature is conventionally 150° C.

A corresponding amount of fossil fuel fired in the kiln will be saved. In addition, steam will be generated equivalent to 13,959,000 kcal/h. If the refuse is added directly to the grate the amount that can be absorbed into the cement process will be limited to about 6.5 tonnes per hour with a potential heat benefit of 14,784,000 Kcal/h.

Analogous calculations can be made in respect of the system illustrated in FIG. 4 of the accompanying drawings.

It will be apparent from the foregoing illustrative description and examples that with reference to the use of waste matter "other than a fuel" the invention extends to waste matter the combustion of which imparts heat to the cement-making process. The invention does not extend, however, to the incineration on their own of substances, hitherto contemplated in cement clinker manufacture primarily as fuels ignited and burned in a zone external to the rotary kiln and yielding a bottom ash combined in the clinker.

What is claimed is:

1. A process of making Portland cement employing at least one rotary kiln supplied with finely divided calcareous and argillaceous materials at one end and fired with fuel supplied at the other end with initially combustion-supporting gas which passes through the kiln; in which process waste matter other than a fuel is incinerated in a zone external to the rotary kiln to yield a gaseous incombustible product and a bottom ash product; said gaseous product from said zone is entrained in calcareous dust-bearing effluent gas from the process for a time sufficient to render such gaseous product innocuous; at least a proportion of said ash product is added to said calcareous and argillaceous materials and chemically combined therewith in the firing of said materials by means of said fuel to form Portlant cement clinker in the rotary kiln; and the resultant clinker is subsequently ground to standard Portland cement.

2. A process according to claim 1, wherein the effluent gas comprises the gas which passes through the kiln.

3. A process according to claim 2, wherein said zone is a zone through which said calcareous and argillaceous materials pass at a temperature such that the waste matter ignites therein.

4. A process according to clai 3, wherein the zone is a portion of a travelling grate preheater for said calcareous and argillaceous materials.

5. A process according to claim 3, wherein the zone is within a gas suspension preheater for said calcareous and argillaceous materials.

6. A process according to claim 3, wherein the zone is within a duct directly connected to said one end of the rotary kiln.

7. A process according to claim 1, wherein said zone is external to the path of the calcareous and argillaceous materials through the process and said gaseous product is employed to impart heat to said materials prior to entry thereof into the rotary kiln.

8. A process according to claim 7, wherein the gaseous product is employed to heat said materials in a spray drier therefor.

9. A process according to claim 1, wherein the zone is a fluidized bed.

10. A process according to claim 8, wherein the zone is a fluidized bed.

11. A process according to claim 1, wherein said bottom ash is incorporated in the calcareous and argillaceous materials prior to entry thereof into the rotary kiln.

12. A process according to claim 1, wherein the waste matter is refuse disintegrated before entry into said zone.

13. In the method of making Portlant cement which comprises the steps of providing finely divided calcareous and argillaceous materials in the form of a raw feed mix, introducing said raw feed mix into one end of a rotary kiln and discharging Portland cement clinker from the other end of the kiln, firing said kiln to produce the Portland cement clinker by introducing fuel and air into said other end of the kiln whereby calcareous dust-bearing gaseous effluent is discharged from said one end of the kiln, separating said dust from the gaseous effluent and then discharging the gaseous effluent to atmosphere, the improvement which comprises:
   a. incinerating a waste product other than a fuel in a zone external to said kiln and at a temperature sufficient to yield a gaseous incombustible product and a bottom ash product;
   b. scrubbing said gaseous incombustible product by entraining said gaseous incombustible product in said calcareous dust-bearing gaseous effluent for a time sufficient prior to the separation of said dust from the gaseous effluent as to render said gaseous incombustible product innocuous;
   c. adjusting the composition of said raw feed mix to accommodate at least a portion of said bottom ash product and obtain a standard Portland cement clinker from said kiln; and
   d. adding said portion of the bottom ash product to said raw feed mix introduced into the kiln.

* * * * *